United States Patent [19]

Maffet

[11] 4,380,496
[45] Apr. 19, 1983

[54] MECHANICAL DEWATERING PROCESS UTILIZING A NONUNIFORM SCREW CONVEYOR

[75] Inventor: Vere Maffet, West Chester, Pa.

[73] Assignee: UOP Inc., Des Plaines, Ill.

[21] Appl. No.: 152,944

[22] Filed: May 23, 1980

Related U.S. Application Data

[63] Continuation-in-part of Ser. No. 22,910, Mar. 22, 1979, Pat. No. 4,237,618, Ser. No. 22,914, Mar. 22, 1979, Pat. No. 4,214,377, Ser. No. 75,575, Sep. 14, 1979, abandoned, and Ser. No. 92,381, Nov. 8, 1979, abandoned, said Ser. No. 22,910, and Ser. No. 22,914, each is a continuation-in-part of Ser. No. 891,437, Mar. 29, 1978, Pat. No. 4,160,732, and Ser. No. 909,587, May 25, 1978, Pat. No. 4,193,206, which is a continuation-in-part of Ser. No. 777,673, Mar. 8, 1977, Pat. No. 4,128,946, Ser. No. 813,577, Jul. 7, 1977, Pat. No. 4,098,006, Ser. No. 813,578, Jul. 7, 1977, Pat. No. 4,099,336, Ser. No. 844,097, Oct. 20, 1977, Pat. No. 4,121,349, Ser. No. 858,879, Dec. 8, 1977, Pat. No. 4,161,825, and Ser. No. 891,437, , which is a continuation-in-part of Ser. No. 813,577, , said Ser. No. 858,879, is a continuation-in-part of Ser. No. 813,577, , and Ser. No. 813,578, , said Ser. No. 844,097, is a continuation-in-part of Ser. No. 813,577, , said Ser. No. 813,577, and Ser. No. 813,578, , each is a continuation-in-part of Ser. No. 777,673.

[51] Int. Cl.³ .............................................. C02F 11/12
[52] U.S. Cl. .................................. 210/780; 210/609; 100/117; 100/148
[58] Field of Search ................ 100/148, 117; 210/609, 210/770, 780, 259

[56] References Cited

U.S. PATENT DOCUMENTS

| | | | |
|---|---|---|---|
| 3,518,936 | 7/1970 | Bredeson | 100/148 X |
| 3,938,434 | 2/1976 | Cox | 100/117 |
| 4,125,465 | 11/1978 | Turovsky et al. | 210/609 |
| 4,260,488 | 4/1981 | Condolios | 210/259 |

FOREIGN PATENT DOCUMENTS

| | | | |
|---|---|---|---|
| 711565 | 6/1965 | Canada | 210/609 |
| 2250610 | 4/1974 | Fed. Rep. of Germany | 210/609 |
| 53-15081 | 5/1978 | Japan | 210/609 |

*Primary Examiner*—Thomas G. Wyse
*Attorney, Agent, or Firm*—James R. Hoatson, Jr.; John F. Spears, Jr.; William H. Page, II

[57] ABSTRACT

A process and an apparatus for mechanically dewatering municipal sewage sludge or peat. The undewatered feed material is passed into the first end of a cylindrical porous wall and pressurized within the cylindrical wall by a rotating screw conveyor, which also transports the solids toward the second end of the cylindrical wall. The screw conveyor comprises a central shaft which has at least two built-up sections of gradually increasing diameter providing a compression ratio of 2.5:1.0. The flight depth of the screw conveyor increases by a factor greater than 2.0 after each built-up section. The distance between the edge of the screw conveyor blade and the inner surface of the cylindrical wall and the structure of the openings in the wall have specific dimensional limitations. Fibrous additives may be used to aid in dewatering peat and secondary sludges.

6 Claims, 2 Drawing Figures

MECHANICAL DEWATERING PROCESS UTILIZING A NONUNIFORM SCREW CONVEYOR

CROSS REFERENCE TO RELATED APPLICATIONS

This application is a continuation-in-part of my prior copending applications Ser. No. 22,910 filed Mar. 22, 1979, U.S. Pat. No. 4,237,618; Ser. No. 22,914 filed Mar. 22, 1979, now U.S. Pat. No. 4,214,377; Ser. No. 75,575 filed Sept. 14, 1979, abandoned; and Ser. No. 92,381 filed Nov. 8, 1979, abandoned.

Applications Ser. No. 22,910 and Ser. No. 22,914 are continuation-in-part of my prior applications Ser. No. 891,437 filed Mar. 29, 1978 and Ser. No. 909,587 filed May 25, 1978.

Application Ser. No. 909,587 is a continuation-in-part of my applications Ser. No. 777,673 filed Mar. 8, 1977; Ser. No. 813,577 filed July 7, 1977; Ser. No. 813,578 filed July 7, 1977; Ser. No. 844,097 filed Oct. 20, 1977; Ser. No. 858,879 filed Dec. 8, 1977 and Ser. No. 891,437.

Application Ser. No. 844,097 is now U.S. Pat. No. 4,121,349. Application Ser. No. 858,879 is now U.S. Pat. No. 4,161,825, and application Ser. No. 891,437 is now U.S. Pat. No. 4,160,732. Application Ser. No. 909,587 is now U.S. Pat. No. 4,193,206.

Application Ser. No. 891,437 is a continuation-in-part of application Ser. No. 813,577, now U.S. Pat. No. 4,098,006.

Application Ser. No. 858,879 is a continuation-in-part of application Ser. Nos. 813,577 and 813,578.

Application Ser. No. 844,097 is a continuation-in-part of application Ser. No. 813,578, now U.S. Pat. No. 4,099,336.

Application Ser. Nos. 813,578 and 813,577 are continuation-in-part of application Ser. No. 777,673, now U.S. Pat. No. 4,128,946.

The entire teaching of my prior applications is hereby expressly incorporated by reference.

FIELD OF THE INVENTION

The invention relates to an apparatus for separating water from moist solids or semi-solid mixtures. The invention is directed to an apparatus and a process for mechanically dewatering sewage sludge or peat. The invention is specifically directed to an apparatus and a process for dewatering peat or a primary or secondary municipal sludge which utilizes a rotating helical blade to pressurize and transport the feed material within a cylindrical porous wall. Apparatus and processes directed to mechanical dewatering are described in U.S. patents now classified in Classes 100 and 210.

PRIOR ART

The need to dispose of the large amounts of sewage sludge which are produced annually has prompted several attempts to develop economic methods of drying sewage sludge. Increasingly stringent environmental standards on the disposal of sewage into rivers and landfills have also acted as a stimulus to the development of such methods. The possibility that the sludge may be useful as a fuel or a fuel supplement is another factor which has prompted efforts to dewater or dry the sludge. One well known method is that utilized in metropolitan Milwaukee, Wisc., to dry municipal sewage sludge and thereby produce an organic plant food called Milorganite. It is believed that the sludge is dried by the use of large rotating kilns through which hot vapors are passed. A different system in which a flash dryer is used is in operation in Houston, Tex. It is therefore well known in the art to dry sewage sludge by contact with hot vapors.

It has long been recognized that it would be advantageous to mechanically remove water from various wastes and by-product sludges such as sewage sludge. In the specific case of sewage sludge, mechanical dewatering would reduce the amount of material to be disposed or transported, or the amount of material to be evaporated during various drying steps, as in the production of solid fertilizers or soil conditioners. Many different types of dewatering apparatus have been developed, but none is believed to have gained widespread usage and acceptance. Both the difficulties encountered in mechanically dewatering sewage sludge and a process for compacting the dried sludge into fertilizer pellets are described in U.S. Pat. No. 2,977,214 (Cl. 71-64).

One specific type of mechanical dewatering apparatus comprises a continuous filter belt which is slowly pulled through solids collection and removal areas. The device presented in U.S. Pat. No. 2,097,529 (Cl. 210-396) is of this type and may be used to dewater sewage sludge. Other sludge dewatering machines utilizing a moving filter belt are shown in U.S. Pat. Nos. 4,008,158 (Cl. 210-386); 4,019,431 (Cl. 100-37); 4,019,984 (Cl. 210-66); 4,066,548 (Cl. 210-160); 4,085,887 (Cl. 233-7) and 4,101,400 (Cl. 204-18OR). A belt or conveyor-type sewage sludge dewatering device is also shown in U.S. Pat. No. 3,984,329 (Cl. 210-396).

U.S. Pat. Nos. 3,695,173 (Cl. 100-74); 3,938,434 (Cl. 100-117) and 4,041,854 (Cl. 100-112) are pertinent for their presentation of apparatus for dewatering sewage sludge in which a helical screw conveyor is rotated within a cylindrical and frusto-conical dewatering chamber having perforate walls. These references all describe apparatus in which the outer edge of the screw conveyor scrapes the inner surface of the perforated cylindrical wall. The inventions presented include specific coil spring wiping blades, slot cleaning blades or brushes attached to the outer edge of the helical blade for continuous contact with the inner surface of the perforate wall, thereby cleaning solids therefrom. The two latest patents in this group are also relevant for their teaching of an alternate embodiment in which the terminal cylindrical portion of the screw conveyor blade does not closely follow the inner surface of the perforate wall but instead has a diameter approximately one-half the diameter of the dewatered solids output opening.

The mechanical dewatering zone of the subject process is distinguishable from this grouping of patents by several points including the provision of a definite annular space between the outer edge of the screw conveyor blade and the inner surface of the perforate wall. This annular space preferably begins at the first end of the screw conveyor, where the feed first contacts the conveyor, and continues for the entire length of the porous wall and of the screw conveyor to the outlet of the apparatus. A layer of mechanically unagitated fiber derived from the entering sewage sludge is retained within this annular space as part of a dewatering process. A second distinguishing feature is the smaller spacing between the parallel windings of the perforated cylindrical wall used in the first stage mechanical dewatering system. Other distinguishing features of the subject apparatus are the nonuniform flight depth of the first screw conveyor and the provision of a second independently rotated screw conveyor.

Other references which utilize a rotating conveyor or auger within a perforated outer barrel are U.S. Pat. Nos. 1,772,262 issued to J. J. Naugle; 3,997,441 to L. F. Pamplin, Jr.; and 1,151,186 to J. Johnson. These references illustrate the use of a precoat layer located in a space between the conveyor and the inner surface of the barrel as an aid to filtration. The Naugle patent discloses that the precoat layer or filter media may be formed from solids present in a liquid to be filtered. However, these references, and particularly the Naugle patent, are directed to the filtration of such materials as sugar juices, suspensions of clays, chalks, and the like rather than fibrous sewage sludge processed in the subject invention. These references also do not teach the specific mechanical limitations and arrangements employed herein to successfully dewater the sewage sludge.

U.S. Pat. No. 4,150,617 presents a modular hydroextractor. In this apparatus, a helical screw is disposed within an outer concentric cylindrical sieve. The screw is used to move high-water-content wastes of various kinds along the length of the sieve and to discharge the relatively dry solids at the outlet of the sieve.

U.S. Pat. No. 4,133,748 describes an apparatus for separating liquid from a feed stream comprising the liquid and solids. A rotating screw conveyor is employed to move solids from the inlet to the outlet of the apparatus. The screw conveyor has a larger flight diameter in a tapered terminal section of the apparatus. A clearance of at least ⅜ of an inch is allowed between the outer edge of the screw conveyor and the rotating screen used in the terminal section of the apparatus.

U.S. Pat. No. 4,125,465 presents a method of treating sluges which includes the steps of coagulation with minerals followed by mechanical dewatering. The dewatered sludge is thermally dried, and a portion of the mineral-containing dried sludge is recycled to the coagulation step to reduce the amount of minerals which are consumed at this point in the process.

BRIEF SUMMARY OF THE INVENTION

The invention provides an apparatus and process effective in mechanically dewatering peat or sewage sludges to a solid content greater than 40–50 wt.%. This process is performed using an apparatus which comprises a porous cylindrical wall which encircles a screw conveyor. The screw conveyor has at least two and preferably three built-up sections along its length during which the flight depth of the screw conveyor gradually decreases and then increases again. It is preferred that a second independently rotated screw conveyor removes dewatered solids from within the porous wall at a controlled rate, and that a fibrous additive is admixed into feed streams which contain peat or significant amounts of secondary sewage sludge.

The apparatus embodiment of my invention may be broadly characterized as comprising a cylindrical porous wall having an inner surface and uniformly distributed openings havings a minimum cross-section width between about 0.00125 cm. and about 0.025 cm.; a first screw conveyor comprising a helical blade mounted on a central shaft and which is centered within the cylindrical porous wall, the helical blade having an outer edge which is separated from the inner surface of the cylindrical porous wall by a distance of from about 0.08 cm. to about 5.0 cm., and with the central shaft having at least two built-up sections within the cylindrical porous wall along which the flight depth of the first screw conveyor gradually decreases due to an increase in the diameter of the central shaft to provide a compression ratio above 2.5:1.0 along each built-up section, with the flight depth of the first screw conveyor increasing by at least a factor of 2.0 at the termination of each built-up section of the central shaft, and with the termination of each built-up section being closer to a second end of the helical blade and a second end of the cylindrical porous wall than to a first end of the helical blade and a first end of the cylindrical porous wall; and means for feeding a material to be dewatered into the apparatus at the first end of the helical blade.

BRIEF DESCRIPTION OF THE DRAWING

Referring now to FIG. 1, a feed stream of sewage sludge or other material, such as peat, enters the first end of the apparatus by flowing downward through the tapered inlet throat 1. The feed stream is pushed into a porous cylindrical wall 3 formed by a spiral wedge-shaped winding 10 which is attached to a plurality of rods 11 which run the length of the porous wall. The feed stream is therein pressurized to a superatmospheric pressure and moved towards the second end of the apparatus by the rotation of a first screw conveyor formed by a helical blade 4 which is mounted on the central shaft 2. The first screw conveyor has three built-up sections along its length. During each of these built-up sections, there is an increase in the diameter of the shaft and a decrease in the flight depth of the screw conveyor as measured from the surface 8 of the built-up section to the outer edge of the helical blade 4. At the end of each built-up section, the flight depth quickly increases by a factor of at least two producing a face 9 where the diameter of the shaft reverts to that found at the first end of the first screw conveyor.

A second screw conveyor, which rotates independently of the first screw conveyor, extends into the second end of the porous wall. This screw conveyor comprises a second helical blade 6 mounted on a central shaft 5 which preferably has a uniform diameter. A small gap 7 is preferably left between the second end of the first screw conveyor and the first end of the second screw conveyor.

Figure 2:
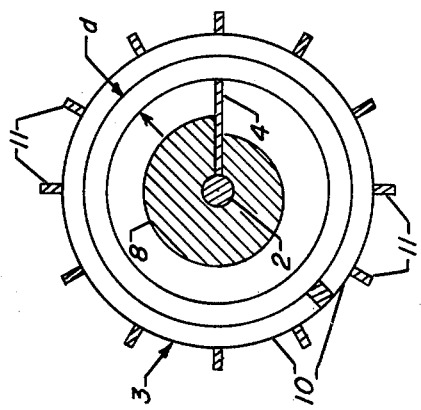
FIG. 2 presents a cross-sectional view along vertical plane 2—2 of FIG. 1 to more clearly show the gradual taper of the built-up sections of the first screw conveyor and the placement of the screw conveyor within the apparatus.

Referring now to FIG. 2, the longitudinal connecting rods 11 are attached at a great many points to the helical winding 10 to form the rigid porous wall 3. The central shaft 2 of the first screw conveyor is concentric with the central axis of the cylindrical porous wall 3. The outer edge of the helical blade 4 is placed a definite distance "d" from the inner surface of the porous wall. The increase in the thickness of the built-up section of the shaft causes the surface 8 of the built-up section to spiral toward the outer edge of the blade.

DETAILED DESCRIPTION

The combined pressure of higher disposal costs and more rigid environmental protection laws has continued to make the utilization of sewage sludge as a revenue-producing material increasingly attractive. Considerable attention has therefore been given to converting the sludge into a fertilizer or soil conditioner. This use of the sludge as fertilizer has proven to be economically unattractive in most instances and may have pollution problems associated with it. The major emphasis in sludge utilization at this time is therefore shifting to the use of the sludge as a combustible fuel.

Most municipal sewage sludges have a final solids content of about 20-22 wt.%. The large amount of water in these sludges makes it impractical to use the sludge as a fuel. The partial removal of the entrained water is therefore necessary to produce a useful combustion-sustaining fuel. Dewatering the sludge may also prove beneficial by reducing odors, limiting liquids runoff, reducing the weight of sludge which is to be transported, recovering water for reuse and by placing the sludge in better condition for subsequent processing.

Water can be driven off sewage sludge by the direct or indirect application of heat. Several systems including those previously referred to employ this technique to dry sludge. However, thermal drying requires the consumption of increasingly expensive fuels and leads to its own problems, including flue gas and vapor stream discharges. It is therefore very desirable to mechanically dewater sewage sludge to the maximum extent possible and feasible and to utilize thermal drying only as a final drying or sterilization step.

The increased cost of petroleum has resulted in more attention being given to large scale use of alternative fuel sources including peat. Large reserves of peat are located in many parts of the world and are relatively easy to locate compared to petroleum. It is also very easy to extract the peat compared to coal or oil. The use of peat as a fuel does, however, have its own problems. One of the most basic of these is the high water content of the peat. Most raw peats will have a solids content of between 5 and 15 wt.% when removed from their source. Since peat will not support its own combustion until it contains about 40-50 wt.% solids, it is necessary to remove a large amount of water from raw underwatered peat before it becomes useful as an energy source. Peat does not give up its water easily, and it is believed that no commercially available system has proven effective in mechanically dewatering raw peat to a solids content over 50 wt.%.

It is an objective of the subject invention to provide an apparatus for mechanically dewatering peat or sewage sludges. It is a further objective of the invention to provide a process for mechanically dewatering peat. It is a specific objective of the invention to provide a process for mechanically dewatering primary or secondary sewage sludges to a solids content above 40-50 wt.%.

The subject invention is directed to the dewatering of feed streams containing peat or sewage sludge. As used herein, the term "dewatering" refers to the removal of water from the sludge by means other than evaporation. Any evaporation which occurs during the dewatering process is only incidental to handling and processing of the feed stream. Less than 1.0 mole percent of the water present in the feed stream should be evaporated during the performance of the subject process. However, more water may evaporate if the feed stream is warmed prior to or during processing as may be desirable with feed streams containing sizable amounts of secondary sludge. An evaporative drying process may be used after the subject dewatering process as a finishing step.

The dewatering zone preferably comprises a porous cylindrical chamber having a first end which is enclosed except for an inlet conduit and an opening for a rotating drive shaft and a second end having an opening for the discharge of the dewatered sludge. The terminal portion of the chamber located adjacent to the first end of the central porous section of the chamber is preferably imperforate to provide greater structural strength. The porous section of the chamber should have a length to inside diameter ratio above 2:1 and preferably from about 4:1 to about 20:1. The inside diameter of this chamber is preferably uniform along the length of the chamber. A major portion of the distance between the ends of the chamber is devoted to providing a porous outer wall through which water is expressed. This porous wall is to be cylindrical and preferably has the same inside diameter as the rest of the chamber.

Figure 1:
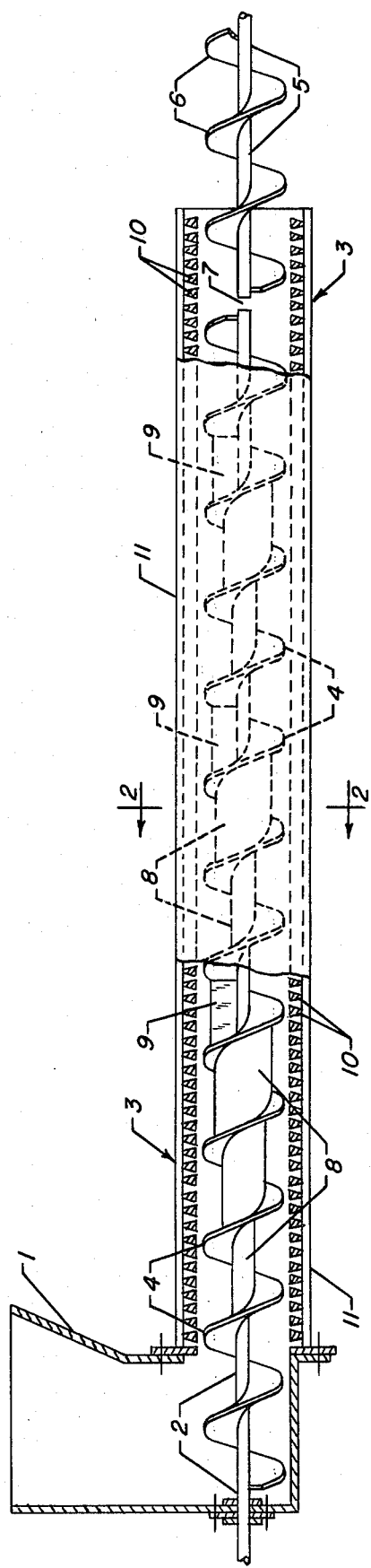
FIG. 1 presents a cross-sectional view along a vertical plane through the subject apparatus.

The porous wall is preferably fashioned from a continuous length of wedge-shaped bar which is welded to several connecting members running along the length of the porous wall as shown in FIGS. 1 and 2. This construction provides a continuous spiral opening having a self-cleaning shape. That is, the smallest opening between two adjacent parallel windings is at the inner surface of the porous wall, thereby providing a continuously widening space which allows any particle passing through the opening to continue outward. The outward movement of these particles is aided by the radially flowing water. The longitudinal connecting rods may be located on either the inside or outside surface of the porous wall. Wedge-shaped wound screens of the desired type are available commercially and are used as well screens and to confine particulate material within hydrocarbon conversion reactors. These screens are further described in U.S. Pat. No. 3,667,615. Other types of porous wall construction meeting the criteria set out herein may also be used.

The distance between adjacent windings, or the equivalent structure of other screen materials, used in the porous wall should be within the broad range of from about 0.00125 to about 0.025 cm. A preferred range of the cross-sectional width of the openings in the porous wall is from about 0.0025 to about 0.0125 cm.

A first screw conveyor having a helical blade is centrally mounted within the porous wall of the cylindrical chamber. The first screw conveyor should have a length to diameter ratio of from 3.0 to about 10.0. The central major axis of this conveyor is preferably coextensive with the major axis of the cylindrical chamber and the porous cylindrical wall. The chamber and porous wall are therefore preferably concentric about the first screw conveyor. It is critical to the proper performance of the process that the outer edge of the blade of the first screw conveyor be spaced apart from the inner surface of the porous wall by a distance greater than about 0.08 cm. but less than about 5.0 cm. This distance should be substantially uniform along the distance the two elements are in juxtaposition. Preferably, the outer edge of the first screw conveyor is at least 0.2 cm. but less than 2.0 cm. from the inner surface of the porous wall. It is especially preferred that a minimum distance of 0.44 cm. is provided between the outer edge of the first screw conveyor and the porous wall.

The purpose of this separation between the first screw conveyor and the wall is to provide a quantity of relatively unagitated layer of material derived from the feed stream which contacts the inner surface of the porous wall. A portion of this material has an annular shape conforming to the volume located between the inner surface of the porous wall and the cylinder swept by the outer edge of the first screw conveyor. The term "unagitated" is intended to indicate that this material is not mixed or sliced by any mechanical element extending toward the porous wall from the blade. This arrangement is contrasted to the previously referred to screw conveyor apparatus in which the surface of the porous wall is "scraped" by the screw conveyor and blades or brushes are attached to the blade to clean the openings in the porous wall.

Although it is free of mechanical agitation, the solids material resting against the inner surface of the porous wall will not be stagnant and undisturbed since it will be subjected to the stress and abrasion which result from the rotation of the screw conveyor. The associated shear stress will extend radially outward through the accumulated solids to the porous wall, thereby exerting a torque and causing some admixture of the accumulated material within the annular volume. This torque will most probably cause the material within the annular volume to rotate with the screw conveyor. The accumulated solids will also be subjected to longitudinal forces pushing it toward the outlet of the apparatus. It is theorized that the solids accumulated within the annular volume may act as a self-cleaning filter media. This action may explain the superior performance of the subject invention as compared to processes in which the filtration is performed at an interface between a static filter belt and the material being dewatered.

The first screw conveyor is rotated to move the sludge being dewatered toward the outlet of the dewatering zone, pressurizing the material within the dewatering zone and thereby causing water to flow radially outward through the annular layer of accumulated material and the porous wall. The first screw conveyor may be rotated at speeds ranging from about 10 to about 150 rpm, or even more rapidly if desired. However, it is preferred to operate the dewatering zone with the first screw conveyor rotating at from 20 to 60 rpm. Only a moderate superatmospheric pressure is required within the dewatering zone. A pressure of less than 500 psig. is sufficient, with the pressure preferably being less than 100 psig. The process may be performed at ambient temperatures, with temperatures below 32° C. being preferred when most organic wastes including primary sewage sludge are to be dewatered. It is therefore not normally necessary to provide either heating or cooling elements along the length of the dewatering zone or to heat the feed stream. However, it has recently been discovered that heat may be advantageously applied during the dewatering of certain secondary sludges. The heat may be applied by a heating element in contact with the upper surface of the porous wall and should heat the sludge to an average temperature of not over 80° C.

The design of the primary or first screw conveyor is subject to some variation. The pitch or helix angle of the blade need not change along the length of the screw conveyor. However, constant pitch is not critical to successful performance of the process, and the pitch may be varied if so desired. Another design factor is the compression ratio of a screw conveyor. The compression ratio refers to the change in the flight depth along the length of the screw conveyor, with the flight depth being measured from the surface of the shaft of the screw conveyor to the outer edge of the helical blade. As used herein, a 10:1 compression ratio is intended to specify that the flight depth at the terminal portion of the screw conveyor is one-tenth as great as the flight depth at the initial or feed receiving portion of the screw conveyor.

The first screw conveyor has two and preferably three sections along which the flight depth of the screw conveyor decreases, with each of these sections being followed by a rapid increase in the flight depth, preferably to its original dimension. Each of these built-up sections should produce a compression ratio of between about 2.5:1.0 and about 10.0:1.0. Preferably, the compression ratio along each built-up section is greater than 4.0:1.0. The increase in the flight depth after each built-up section may be quite sharp and is preferably completed in less than one-half revolution (one-half flight) of the helical blade. This will produce a rather sharp face in the surface of the screw conveyor and a cavity in which the feed stream solids are admixed and reconstituted. The flight depth of the screw conveyor should increase by a factor of at least 2.0 at the termination of each built-up section and preferably by more than a factor of 4.0. Up to five built sections may be provided.

A design which has proven to be highly effective in dewatering municipal sludge comprises a porous wall of the preferred type which has an internal diameter of about 10.16 cm. The length of that portion of the first screw conveyor contained within this porous wall is approximately 71 cm. This first screw conveyor has three built-up sections, with the first built-up section starting at the point where the porous wall begins and is attached to the feed hopper. The first built-up section is completed in three flights of the screw conveyor and the next two built-up sections are each completed in two flights for a total of seven flights of the screw conveyor used within porous wall. Several flights of the conveyor are used in the feed hopper for charging the feed stream into the porous wall. The shaft on which the helical blade is mounted is approximately 4.1 cm. in diameter at its smallest point before the built-up sections. The first built-up section preferably has a slightly lower compression ratio than the succeeding built-up sections. In outer surface of the first built-up section is within about 1.0 cm. of the outer edge of the helical blade while the difference between these two points is about 0.6 cm. on the final two built-up sections.

One embodiment of the invention may be characterized as an apparatus useful in dewatering sewage sludge or peat which comprises a cylindrical porous wall having an inner surface and uniformly distributed openings having a minimum cross-sectional width between about 0.00125 cm. and about 0.025 cm.; a first screw conveyor comprising a helical blade mounted on a central shaft and which is centered within the cylindrical porous wall, the helical blade having an outer edge which is separated from the inner surface of the cylindrical porous wall by a distance of from about 0.08 cm. to about 5.0 cm., and with the central shaft having at least two built-up sections within the cylindrical porous wall along which the flight depth of the first screw conveyor gradually decreases due to an increase in the diameter of the central shaft to provide a compression ratio above 2.5:1.0 along each built-up section, with the flight depth of the first screw conveyor increasing by at least a factor of 2.0 at the termination of each built-up section of the central shaft, and with the termination of each built-up section being closer to a second end of the helical blade and a second end of the cylindrical porous wall than to a first end of the helical blade and a first end of the cylindrical porous wall; and means for feeding a material to be dewatered into the apparatus at the first end of the helical blade.

The smooth and continuous operations of the subject apparatus is subject to occasional interruptions caused by the buildup of a compact mass of dewatered solids within the porous wall near the outlet of the dewatering zone if only the first screw conveyor is used. This clog originates at the constriction or other means used to maintain the necessary backpressure on the sludge which is being dewatered. A suitable means of maintaining this backpressure is the extension of the porous wall for some distance (1.5–3.0 wall diameters) past the end of the first screw conveyor. The formation of a plug of overly dewatered solids in the terminal section of the porous wall raises the backpressure which is exerted on the remainder of the sludge within the dewatering zone, causing this sludge to also lose an excessive amount of water. The clog thereby propagates toward the inlet of the dewatering zone. It is then necessary to halt the dewatering process, disassemble the apparatus, and remove the compacted solids. This operational problem is associated with the variable nature of the composition of the sewage sludge, which often varies in the type of sludge (% primary or secondary), water content, fiber content, and physical and chemical composition.

To overcome operational problems caused by the accumulation of compacted dewatered solids at the outlet end of the porous wall, a second or ejector screw conveyor is provided. The second screw conveyor preferably extends from a point close to the second end of the first screw conveyor to the opening through which dewatered solids are discharged from the dewatering zone. The second screw conveyor preferably has approximately the same diameter as the first screw conveyor and a longitudinal axis which is coincident with that of the first screw conveyor. The basic purpose of the second screw conveyor is the transportation of dewatered solids rather than dewatering. It is therefore preferred that the pitch and flight depth of the screw conveyor remain constant along the length of the screw conveyor. The second screw conveyor may have a different diameter than the first screw conveyor, with the second screw conveyor being larger and leaving a smaller gap between the outer edge of its blade and the enclosure which surrounds it. That is, the second screw conveyor may be sized to ensure positive movement of dewatered solids by providing only the minimum gap required for the free rotation of the screw conveyor. The second screw conveyor is shorter in length than the first screw conveyor and preferably is less than one-third the length of the first screw conveyor. In referring to the end of a screw conveyor, it is intended to indicate the termination of the helical blade which is attached to the central shaft of the conveyor, which may extend out of the dewatering zone. The distance between the second end of the first screw conveyor and the first end of the second screw conveyor should be less than 8.9 cm. and is preferably less than 5.1 cm.

The second screw conveyor may be housed within a continuation of the porous wall as shown in the Drawing or within a separate unperforated cylinder. Preferably, the housing which encircles a portion of the second screw conveyor is the same porous wall which surrounds the first screw conveyor. In this embodiment of the apparatus, both the second end of the first screw conveyor and a portion (from one to two flights) of the second screw conveyor are located within the cylindrical porous wall. The housing which encircles the second screw conveyor may have a shaped discharge opening to direct the dewatered solids downward or to either side. A stationary blade wiper may be positioned at the outlet to ensure the positive removal of the dewatered solids from the helical blade. In the variation of the structure of the dewatering apparatus shown in the Drawing, the housing which encircles the second screw conveyor terminates in a vertical plane perpendicular to the screw conveyor. In this embodiment, the dewatered solids simply fall from the end of the cylindrical housing. The housing may include a bearing which aligns the shaft of the second screw conveyor with the cylindrical internal volume of the housing and also lessens the translational movement of the screw conveyor.

The second screw conveyor is rotated independently of the first screw conveyor. That is, the two screw conveyors are not mechanically joined in any manner which requires them to rotate at the same or proportional speeds. They may be connected to a common bearing or other guide to keep them in alignment with the other parts of the dewatering zone, but they are to rotate independently in this common connection. The two screw conveyors may rotate at different speeds and in different directions. However, it is preferred that both screw conveyors rotate in the same direction, and it is also preferred that the second screw conveyor rotates at a slower rate than the first screw conveyor. The second screw conveyor preferably rotates at a rate between 10 and 50 rpm. It is also preferred that the blades of the two screw conveyors are both either left-handed or right-handed in their curvature about the respective shafts.

The rate of rotation of the second screw conveyor may be constant. However, in a more limited embodiment of the inventive concept, the rate of rotation of the second screw conveyor is variable and is periodically adjusted as required. Adjustments may be based on a measurement of a physical characteristic of the dewatered solids at the outlet of the dewatering zone or on the operation of the dewatering zone itself, such as a pressure within the porous wall or the energy required to turn the first screw conveyor. It is preferred that the moisture content of the solids effluent stream is continuously monitored as the variable used to determine the required adjustment in the rate of rotation of the second screw conveyor. Laboratory type spot analyses are not suitable for automated control systems, and a continuous automatic means of monitoring the water content of the effluent is employed. One such continuous means which has proven to be usable is an infrared moisture sensor model No. MR sold by Moisture Register Company, North Hollywood, Calif.

The signal generated by the moisture sensor, or other monitoring means, is transmitted to a controller. The controller may be integrated into the moisture sensor or may be a separate unit. The function of the controller is to compare the signal generated by the moisture sensor, which is representative of the present water content of the dewatering zone effluent stream, to a predetermined reference value or signal which is representative of the desired water content of the effluent stream. This desired water content may be between about 35 and 70 wt.% water with the preferred apparatus, with the reference value being chosen to be less than the maximum potential performance of the apparatus in order to allow the system a margin for error and some built-in time buffer. The controller generates a second signal which is transmitted to a speed control system of the drive means of the second screw conveyor. This speed control system may be a variable speed transmission which is connected between the screw conveyor and a constant speed electric motor or other driver. The speed control system may also be a means of varying the electrical power supplied to a variable speed electric motor.

As used herein, the term "drive means" is intended to indicate the mechanical system which produces the rotational force which acts upon a specific screw conveyor. The preferred form of the drive means is a constant speed (AC) electric motor coupled to a V-belt drive variable speed transmission, with a separate drive means being provided for each screw conveyor. A single electric motor could also be used to rotate both screw conveyors if the appropriate drive connections are provided.

The feed stream charged to the subject process should contain at least 65 wt.% water. It preferably contains at least 75 wt.% water but may contain up to 90 wt.% or more water. However, the preferred feed streams do not comprise fluid sewage streams which do not have a sufficient solids content to be somewhat self-supporting and immobile. That is, the sludges are preferably the products of settling, filtration or coagulation steps rather than the watery materials fed to these steps. The typical municipal sludge will contain about 20 to 22 wt.% solids. The feed stream may be 100% primary sewage sludge. Alternatively, it may be a mixture of primary and secondary sludges, or the feed stream may contain 100% secondary sludge. The dewatering zone effluent stream may contain from about 35 to about 65 wt.% solids. It is preferred that this stream contains at least 40 wt.% solids, and more preferably at least 45 wt.% solids. The peat present in the feed stream is preferably in substantially the same form as it was removed its source.

The subject process may be used to dewater either a "primary" or a "secondary" sewage sludge. Such characterizations of the sludge may not be totally accurate and must be construed within the context of their use. For instance, the "secondary" sludge supplied by municipalities to the test site has in many instances been found to actually be an admixture of both primary and secondary sludges. Problems in accurately describing sludges also arise because "raw" sewage sludge begins to digest in holding tanks and other storage containers. The characterization herein of sludges is therefore purposely held to a minimum to prevent confusion and misleading statements.

In a more limited embodiment of the subject invention, the composition of an undewatered feed stream which contains at least 50% secondary sludge is modified by the addition of a fibrous additive. It has been discovered that the admixture of a sufficient quantity of the fibrous additive into the sludge reduces or eliminates the thixotropic character of the sludge and allows the sludge to be readily dewatered by compression against a water-permeable surface which retains the solids content of the sludge-additive admixture.

The additive which is admixed with the wet sludge feed stream is fibrous. Discrete particles of the additive should have a length in excess of 0.32 cm. and preferably in excess of 0.65 cm. Rather long stands of about 2.5 cm. or more in length can be employed. If the additive is very flexible, as is shredded newspaper, the additive pieces may have virtually any length which does not render impractical the admixture of the additive and the sludge. To facilitate admixing, the individual additive particles are preferably less than 1.3 cm. Wide and more preferably are less than 0.65 cm. wide. The additive particles therefore preferably have the shape of ribbon-like strips or strands.

The additive is preferably a very low cost widely available waste material such as vegetation stalks. Materials which are contemplated for use as the additive in the subject invention included shredded newsprint, shredded Kraft paper, pieces of bagasse, dried and shredded weed stalks, wood chips, dried leaves, shredded tree branches, features, and cotton gin trash. Most of these materials share the common characteristic of being derived from the rather fibrous parts of plants. These additives may be generally characterized as comprising cellulose and often containing lignin. Fibrous additives other than those listed above should also be suitable for use in the subject invention and may be easily evaluated. Shredded fabrics, both natural and synthetic, are also contemplated for use as the additive. The fibrous additive may be a mixture of two or more materials.

A low cost additive which will normally be easy to obtain, using the subject process, for use in dewatering secondary municipal sludge is partially dewatered primary sewage sludge. This partially dewatered primary sludge should contain over 40 wt.% solids. It should be mixed into the secondary sludge which is being dewatered at the rate of at least 1.0 pound of dewatered primary sludge for every 5.0 pounds of secondary sludge which is being dewatered. The admixture of the two sludges should contain over 30 wt.% solids.

The amount of the additive which must be admixed into the feed sludge will vary with the composition of the feed sludge. The most pertinent variables of the sludge composition in this respect appear to be the type of sludge (primary or secondary, etc.), the fiber content, and the solids concentration of the sludge. The amount of the additive which is required may also vary depending on what particular material is being used as the additive. Due to these variables, it is not possible to predict the minimum required amount of the additive for all possible sludge-additive combinations. However, suitable amounts of the additive may be determined with relative ease with only a few trials. It has been determined that for a secondary municipal sludge of about 20% solids content, it is normally necessary to add about 0.5 oz. of the additive into each pound of the wet sludge to achieve satisfactory results. It is believed that at least 0.3 oz. of the additive should be used in all cases for a secondary sludge or an undewatered peat. It is preferred that at least 1.0 oz., but less than 4.0 oz. of the additive is added to each pound of a wet sludge or peat which is to be processed. The additive is preferably dry when admixed with the sludge. A water content of less than 30 wt.% is considered as "dry" as the term is used herein to describe the additive.

A second embodiment of the invention may therefore be characterized as a mechanically dewatering process which comprises the steps of passing a feed stream which comprises sewage sludge or peat and which comprises at least 50 wt.% water into a first end of a mechanical dewatering zone which comprises a first screw conveyor which is at least partially contained within a cylindrical porous wall concentric with the first screw conveyor, with the cylindrical porous wall having an inner surface and uniformly distributed openings having a minimum cross-sectional distance between about 0.00125 cm. to about 0.025 cm., and with the first screw conveyor comprising a helical blade mounted on a central shaft, the helical blade having an outer edge which is separated from the inner surface of the cylindrical porous wall by a distance of from about 0.08 cm. to about 5.0 cm., and with the central shaft having at least two built-up sections within the cylindrical porous wall along which the flight depth of the first screw conveyor gradually decreases due to an increase in the diameter of the central shaft to provide a compression ratio above 2.5:1.0 along each built-up section, with the flight depth of the first screw conveyor increasing by at least a factor of 2.0 at the termination of the built-up section of the central shaft, which termination is closer to a second end of the mechanical dewatering zone than to the first end of the mechanical dewatering zone; pressurizing the feed stream within the cylindrical porous wall to a superatmospheric pressure by rotating the first screw conveyor; withdrawing water radially outward through the cylindrical porous wall; transporting solids derived from the feed stream which are located in the grooves of the helical blade of the first screw conveyor to a second end of the first screw conveyor; and withdrawing a dewatering zone solids stream which comprises at least 35 wt.% solids from the second end of the mechanical dewatering zone through the use of a second screw conveyor which is independently rotated and at least partially located within the cylindrical porous wall.

It is not necessary to adjust the pH of feed streams containing municipal sludges or peat and it may be processed in the same condition as received. No chemical additives are required for successful operation of the process, and any recycling performed during the process is solely to adjust solids contents or for the purpose of fiber addition.

I claim as my invention:

1. A mechanical dewatering process which comprises the steps of:
    (a) passing a feed stream which comprises sewage sludge or peat and which comprises 50 wt.% water into a first end of a mechanical dewatering zone which comprises a first screw conveyor which is at least partially contained within a cylindrical porous wall concentric with the first screw conveyor, with the cylindrical porous wall having an inner surface and uniformly distributed openings having a minimum cross-sectional distance between about 0.00125 cm. and about 0.025 cm., and with the first screw conveyor comprising a helical blade mounted on a central shaft, the helical blade having an outer edge which is separated from the inner surface of the cylindrical porous wall by a distance of from about 0.08 cm. to about 5.0 cm., and with the central shaft having at least two built-up sections within the cylindrical porous wall along which the flight depth of the first screw conveyor gradually decreases due to an increase in the diameter of the central shaft to provide a compression ratio above 2.5:1.0 along each built-up section, with the flight depth of the first screw conveyor increasing by at least a factor of 2.0 at the termination of the built-up section of the central shaft, which termination is closer to a second end of the mechanical dewatering zone than to the first end of the mechanical dewatering zone;
    (b) pressurizing the feed stream within the cylindrical porous wall to a superatmospheric pressure by rotating the first screw conveyor;
    (c) withdrawing water radially outward through the cylindrical porous wall;
    (d) transporting solids derived from the feed stream which are located in the grooves of the helical blade of the first screw conveyor to a second end of the first screw conveyor; and,
    (e) withdrawing a dewatering zone solids stream which comprises at least 35 wt.% solids from the second end of the mechanical dewatering zone.

2. The process of claim 1 further characterized in that the cylindrical porous wall comprises parallel windings which are spaced apart by a distance of about 0.00125 cm. to about 0.025 cm.

3. The process of claim 2 further characterized in that the central shaft of the screw conveyor has three built-up sections which are located within the cylindrical porous wall.

4. The process of claim 3 further characterized in that the compression ratio along each built-up section of the central shaft is greater than 4.0:1.0.

5. The process of claim 1 further characterized in that the distance between the outer edge of the helical blade and the inner surface of the cylindrical porous wall is between 0.44 and 2.0 cm.

6. The process of claim 5 further characterized in that the cylindrical porous wall comprises parallel windings which are spaced apart by a distance of about 0.0025 cm. to 0.0125 cm.

* * * * *